US009355493B2

(12) United States Patent
Wong

(10) Patent No.: US 9,355,493 B2
(45) Date of Patent: May 31, 2016

(54) DEVICE AND METHOD FOR COMPOSITING VIDEO PLANES

(75) Inventor: Daniel Wong, Cupernito, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1202 days.

(21) Appl. No.: 11/967,440

(22) Filed: Dec. 31, 2007

(65) Prior Publication Data

US 2009/0167785 A1    Jul. 2, 2009

(51) Int. Cl.
*G06T 15/50*     (2011.01)

(52) U.S. Cl.
CPC .................. *G06T 15/503* (2013.01)

(58) Field of Classification Search
CPC .............. G09G 5/026; G09G 2340/10; G09G 2340/12; G09G 2340/125
USPC ......................................... 345/592, 629–641
See application file for complete search history.

(56) References Cited

U.S. PATENT DOCUMENTS

| | | | |
|---|---|---|---|
| 5,745,121 A * | 4/1998 | Politis ........................... 345/619 |
| 6,339,432 B1 * | 1/2002 | Grossman ..................... 345/639 |
| 6,529,208 B1 * | 3/2003 | Chun et al. .................... 345/629 |
| 6,577,679 B1 * | 6/2003 | Apostolopoulos ....... 375/240.12 |
| 7,483,042 B1 * | 1/2009 | Glen .............................. 345/629 |
| 7,814,422 B2 * | 10/2010 | Yahata et al. ................. 715/719 |
| 2004/0160456 A1 * | 8/2004 | Steele et al. .................. 345/612 |
| 2005/0024363 A1 * | 2/2005 | Estrop ........................... 345/501 |
| 2007/0126753 A1 * | 6/2007 | Moore et al. .................. 345/592 |
| 2007/0147703 A1 * | 6/2007 | Watson et al. ................ 382/284 |

OTHER PUBLICATIONS

Porter, Thomas and Tom Duff, "Compositing Digital Images", Computer Graphics, Proceedings of SIGGRAPH '84, Jul. 1984, pp. 253-259, vol. 18, No. 3, Association for Computing Machinery.

* cited by examiner

*Primary Examiner* — Aaron M Richer
(74) *Attorney, Agent, or Firm* — Faegre Baker Daniels LLP

(57) ABSTRACT

A device and method of forming a video frame from a video stream made up of a multiplexed plurality of sub-streams is disclosed. The method includes forming a foreground plane, forming a mask that represents opaque pixels in the foreground plane, and forming an underlying plane from at least one of the sub-streams and extracting a transparency value associated with each pixel in the foreground and underlying planes. Only those pixels in the underlying and foreground planes not covered by the mask, are blended in accordance with their associated transparency value in a buffer. The buffer is populated with opaque pixels from the foreground plane, at pixel locations corresponding to the mask.

18 Claims, 5 Drawing Sheets

DEVICE AND METHOD FOR COMPOSITING VIDEO PLANES

FIELD OF THE INVENTION

The present invention relates generally to digital video players, and more particularly to efficient methods for displaying multilayered digital video streams.

BACKGROUND OF THE INVENTION

Digital video is increasingly becoming ubiquitous with wide ranging applications in entertainment, education, business and broadcasting. As such, digital media such as the digital versatile disc (DVD) for example, have been rapidly replacing older analog technologies such as the video home system (VHS), as the preferred means for the distribution of audiovisual content.

The DVD became a popular medium of digital content distribution since it allowed convenient distribution of large amounts of recorded digital data including video, audio, software and electronic documents at a relatively low cost. This is due in part, to the fact that digital processing of video signals has benefited significantly from advances in integrated circuits. The decreasing cost and increasing power of integrated circuits have readily translated into quality improvements in digital video players at reduced costs.

Nonetheless, movies distributed using DVDs are of standard definition (SD) resolution and lately, higher resolution formats such as Blu-ray and high definition DVD (HD DVD), which encode video in high definition (HD) resolution have become increasingly popular.

These newer digital distribution formats include a wide array of added features designed to enhance the user experience especially when viewing video. These include newer and advanced video compression algorithms, surround sound audio, as well as many informative and interactive features delivered through multiple presentation layers in addition to a main video layer.

An HD DVD disc for instance, may include a background plane, a main video plane, secondary video plane, and subtitle graphics plane, among others. A Blu-ray disc may contain a presentation graphics plane and an interactive graphics plane, which are combined with a main video plane, to form final images for display. These additional layers are used to provide features such as improved subtitles, interactive menus, command buttons and the like.

The presence of additional layers or planes of video adds significantly to the complexity of tasks performed by a video player that processes them to form a final video image for display. The added tasks increase the computational load on the decoding and processing subsystems of a digital video player. Unfortunately this often requires an increase in the numbers of transistors included within the integrated circuitry of the video player and consequently leads to increased level of power consumption and heat dissipation.

In addition to decoding planes from several layers, the player must composite or combine corresponding decoded planes in each layer, to form a final image for display. This combining process often involves determining the transparency level or opaqueness of each pixel of each layer's plane and computing a final pixel using the corresponding pixels of each layer in relative proportion to their transparency. Methods for compositing digital images have been suggested, for example in T. Porter and T. Duff, "Compositing Digital Images", Proceedings of SIGGRAPH '84, 18 (1984).

Straight-forward applications of known compositing methods can be very inefficient. As can be appreciated, compositing is a compute-intensive process, and can be potentially wasteful if performed on a large number of pixels that do not contribute to the final image. Accordingly there is a need to reduce the computational load and associated power consumption required to decode and efficiently display multilayered digital video.

SUMMARY OF THE INVENTION

In accordance with an aspect of the present invention, there is provided, a method of forming a video frame from a video stream comprising a multiplexed plurality of sub-streams. The method includes forming a foreground plane; forming a mask from the foreground plane, representing opaque pixels in the foreground plane; forming an underlying plane from at least one of the sub-streams; and extracting a transparency value associated with each pixel in the foreground, and underlying planes. The method further includes blending only those pixels in the underlying and foreground planes not covered by the mask, in accordance with their associated transparency value, in a buffer; and populating the buffer with opaque pixels from the foreground plane, at pixel locations corresponding to the mask.

In accordance with an aspect of the present invention, there is provided, a device including a processing engine in communication with memory. The memory includes an image buffer and a stencil buffer. The processing engine includes a processor, a graphics processing unit (GPU), and an input for receiving a compressed video data stream. The processing engine decodes a foreground plane and a plurality of underlying planes from the stream. Each of the planes include a plurality of pixels and an associated transparency value for each pixel. The processing engine is operable to form a mask in the stencil buffer representing opaque pixels in the foreground plane; and blend only those pixels in the planes, not covered by the mask, in accordance with their the associated transparency value, in the image buffer. The processing engine is further operable to populate pixel locations in the image buffer covered by the mask, with the opaque pixels from the foreground plane.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention, FIG. 1 a simplified block diagram of a video player device.

DETAILED DESCRIPTION

Figure 1:
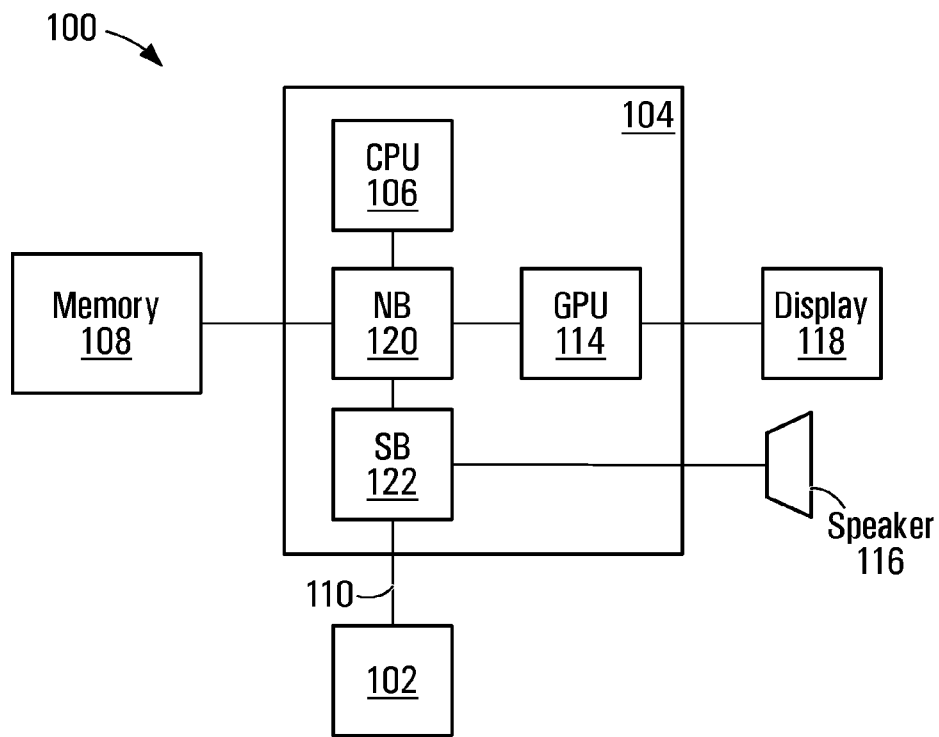

FIG. 1 illustrates a simplified block diagram of a video player device 100. Device 100 includes an optical drive 102, a processing engine 104, and memory 108. A bus 110 interconnects processing engine 104 and optical drive 102. Processing engine 104 may contain a graphics processing unit (GPU) 114, a general purpose processor 106, a memory interface circuit 120 (sometimes called the "North Bridge"), and input-output (I/O) interface circuit 122 (sometimes called the "South Bridge"). A speaker 116 interconnected to processing engine 104 is used to output audio encoded onto an HD DVD disc after decompression by processing engine 104. A display 118 interconnects processing engine 104 and is used to display video decoded by device 100.

Device 100 may be an HD DVD player capable of decoding and displaying encoded digital video distributed using a medium such as an HD DVD disc; or a computing device such as a personal computer (PC) or a laptop computer, equipped with an HD DVD drive. Bus 110 may, for example, be a serial advanced technology attachment (SATA) bus or a similar suitable bus. Processor 106 may be a central processing unit (CPU) with an Intel x86 based architecture. GPU 114 may be part of a Peripheral Component Interconnect Express (PCIe) graphics card. Memory 108 may be shared by processor 106 and GPU 114 using memory interface circuit 120. Additional local memory (not shown), residing in processing engine 104 may be directly accessible to GPU 114 without the use of memory interface circuit 120.

Displaying video from a computer readable medium such as HD DVD disc or a Blu-ray disc, containing multi-layer or multi-stream video involves decoding of each of the layers (sub-streams) in the disc, and compositing each layer. In other words, video stored on a disc, or received otherwise by processing engine 104, may be in the form of multiple sub-streams typical multiplexed together.

Figure 2:
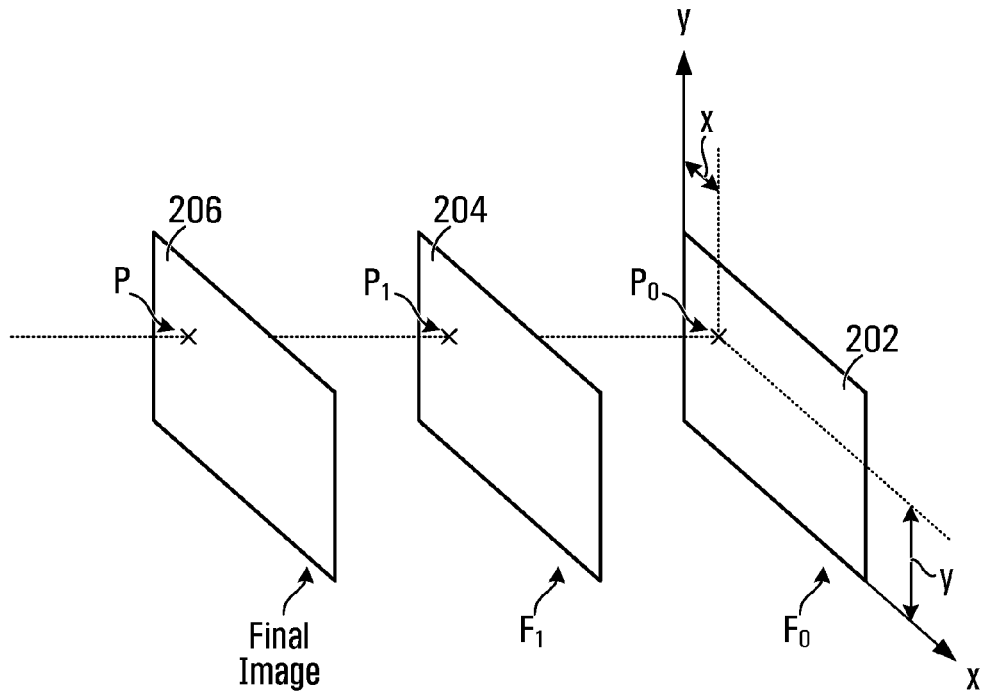
FIG. 2 is a logical diagram illustrating conventional composition of a final image pixel from corresponding pixels in a foreground plane and an underlying background plane.

Each sub-stream may correspond to a video plane. Corresponding planes from each sub-stream or layer may be combined together in a process called digital compositing or alpha-blending, to form a final image. FIG. 2 is a schematic diagram of planes 202, 204 from two layers that are composited to form a final image 206. Alpha-blending involves obtaining transparency information about each of the pixels of a plane from each layer and combining pixels occupying the same location in their respective planes, in accordance with their corresponding transparency values to form a final pixel. The transparency value of a given pixel is called an alpha channel or alpha value for the pixel.

Color pixels with transparency values are often stored as quadruples (R, G, B, α) where R, G, B represent red, green, and blue color components respectively and α represents the opacity or transparency of the pixel. The value of α may range from 0 to 1 ($0 \leq \alpha \leq 1$). A setting of α=0 represents complete transparency while a setting of α=1 represents total opacity for the associated pixel. Accordingly, 1−α represents the fraction of an underlying background pixel color allowed to pass, through to the next layer. A transparency value of α=1 for a foreground pixel therefore blocks a corresponding background pixel completely.

Transparency information may be stored in a variety of formats. For example, to avoid multiplication during the compositing an rendering stage, the red, green and blue components may be pre-multiplied and the quadruples may be stored as (Rα, Gα, Bα, α). The original un-multiplied RGB color can easily be retrieved if desired by dividing each color component by α. In addition, if R, G and B are stored as n-bit integers, α may be also stored as an n-bit integer after multiplication by $2^n$. If desired, α may be converted back to a value between 0 and 1 by dividing it by $2^n$. For example a device may use n=8, and store each channel R, G, B and α as 8-bit integers. If needed, α may be converted to a value between 0 and 1 by dividing it by $2^8=255$. The storage format for the transparency value is may be changed depending on the needs of a particular application. Transparency information may be stored in the YCbCr space as well.

FIG. 2 depicts a logical diagram illustrating a conventional composition of a final image pixel from corresponding pixels in a foreground plane and an underlying background plane. As shown, a background plane 202 contains a pixel $P_0$ at pixel coordinates (x,y) and a foreground plane 204 contains pixel $P_1$ at the same pixel coordinates (x,y). $P_0$ has color and opacity values denoted by the quadruple $(r_0, g_0, b_0, \alpha_0)$ and similarly $P_1$ has color and opacity values $(r_1, g_2, b_1, \alpha_1)$. As a background plane would be typically be fully opaque, $\alpha_0$ may be set to 1 so that $P_0$ may also be denoted by the quadruple $(r_0, g_0, b_0, 1)$. Now, to composite final image 206, each color component (e.g. red) of the pixel P with color components (R,G,B) at coordinate (x,y) of the final image is computed.

Let $R_{[m]}$ denote the red component of a pixel in a final image after m layers are composited. Thus for just one plane (e.g. background plane 202) the red component $R_{[1]}$ in final image 206 is computed as $R_{[1]} = \alpha_0 r_0$ which reduces to $R_{[1]} = r_0$ when $\alpha_0 = 1$.

When two planes such as background plane 202 and foreground plane 204 are composited, then the resulting red component $R_{[2]}$ in final image 206 is computed as:

$$R_{[2]} = (1-\alpha_1)\alpha_0 r_0 + \alpha_1 r_1 \quad [1]$$

If pre-multiplied values are used, then equation [1] may be rewritten as $$R'_{[2]} = (1-\alpha_1)r'_0 + r'_1 \text{ where } r'_0 = \alpha_0 r_0 \text{ and } r'_1 = \alpha_1 r_1 \quad [2]$$

Suppose there is an additional layer, containing a pixel $P_2 = (r_2, g_2, b_2, \alpha_2)$ at location (x, y) then the red component $R_{[3]}$ of the final pixel may be computed in the same manner by considering $R_{[2]}$ (calculated above) as the new background pixel. Therefore, applying equation [1] to (the red components of) the new background pixel $R_{[2]}$ and foreground pixel $r_2$, $R_{[3]}$ may be computed as:

$$R_{[3]} = (1-\alpha_2)R_{[2]} + \alpha_2 r_2$$

Substituting $[(1-\alpha_1)\alpha_0 r_0 + \alpha_1 r_1]$ for $R_{[2]}$ we have:

$$R_{[3]} = (1-\alpha_2)[(1-\alpha_1)\alpha_0 r_0 + \alpha_1 r_1] + \alpha_2 r_2$$
$$= (1-\alpha_2)(1-\alpha_1)\alpha_0 r_0 + (1-\alpha_2)\alpha_1 r_1 + \alpha_2 r_2$$

Again, using pre-multiplied values $R'_{[3]} = (1-\alpha_2)(1-\alpha_1)r'_0 + (1-\alpha_2)r'_1 + r'_2$ If there is yet another layer containing pixel $P_3 = (r_3, g_3, b_3, \alpha_3)$ at (x,y) then the new red component $R_{[3]}$ in the final pixel similarly calculated as:

$$R_{[4]} = (1-\alpha_3)R_{[3]} + \alpha_3 r_3$$

-continued $$= (1-\alpha_3)[(1-\alpha_2)(1-\alpha_1)\alpha_0 r_0 + (1-\alpha_2)\alpha_1 r_1 + \alpha_2 r_2] + \alpha_3 r_3$$

$$= (1-\alpha_3)(1-\alpha_2)(1-\alpha_1)\alpha_0 r_0 + (1-\alpha_3)(1-\alpha_2)\alpha_1 r_1 +$$

$$(1-\alpha_3)\alpha_2 r_2 + \alpha_3 r_3,$$

or $$R'_{[4]} = (1-\alpha_3)(1-\alpha_2)(1-\alpha_1)r'_0 + (1-\alpha_3)(1-\alpha_2)r'_1 + (1-\alpha_3)r'_2 + r'_3$$ if pre-multiplied values are used.

These equations may be generalized—so that for a multi-layer image with a background layer and n additional layers, the color component in the final image may be computed as $R_{[n+1]} = (1-\alpha_n)R_{[n]} + r_n\alpha_n$ which, after substations and simplification becomes:

$$R_{[n+1]} = (1-\alpha_n)\ldots(1-\alpha_1)\alpha_0 r'_0 + (1-\alpha_n)\ldots(1-\alpha_2)r_1\alpha_1 + \ldots + (1-\alpha_n)\alpha_{n-1}r_{n-1} + \alpha_n r_n.$$

Again if pre-multiplied values are used, the equation reduces to:

$$R'_{[n+1]} = (1-\alpha_n)\ldots(1-\alpha_1)r'_0 + (1-\alpha_n)\ldots(1-\alpha_2)r'_1 + \ldots + (1-\alpha_n)r'_{n-1} + r'_n$$

The green and blue components of the pixel in the final image can be similarly computed as shown below.

$$G'_{[n+1]} = (1-\alpha_n)\ldots(1-\alpha_1)g'_0 + (1-\alpha_n)\ldots(1-\alpha_2)g'_1 + \ldots + (1-\alpha_n)g'_{n-1} + g'_n$$

$$B'_{[n+1]} = (1-\alpha_n)\ldots(1-\alpha_1)b'_0 + (1-\alpha_n)\ldots(1-\alpha_2)b'_1 + \ldots + (1-\alpha_n)b'_{n-1} + b'_n$$

Conventional video players typically receive and decode each layer's planes and then combine them by computing final pixels as linear combinations of each layer's corresponding pixels as shown above. From the equations, it should be apparent that alpha-blending multiple planes from several layers to form a final image adds to the computational load of a video player device.

If some planes either at the top or bottom of the stack are updated at a statistically lower frequency, then relatively static parts may be pre-computed and stored to speed up the calculations.

Moreover, the composition is performed without knowledge of actual distribution of transparency values. Information about the contribution of a decoded pixel's color component, to the finally displayed image pixel is not utilized prior to compositing. Consequently, each pixel of each layer is processed during composition, although some pixels from some layers need may not contribute to the final image at all. As can be appreciated, this approach may be very inefficient.

In particular, if a pixel from a given layer is completely opaque, then there is no need to compute the contributions of pixels that are behind it (in the underlying layers). Computing the contributions of multiple pixels from pixels that are behind opaque pixels, (and thus ultimately do not affect the final pixel) is thus wasteful of GPU cycles.

Figure 3:
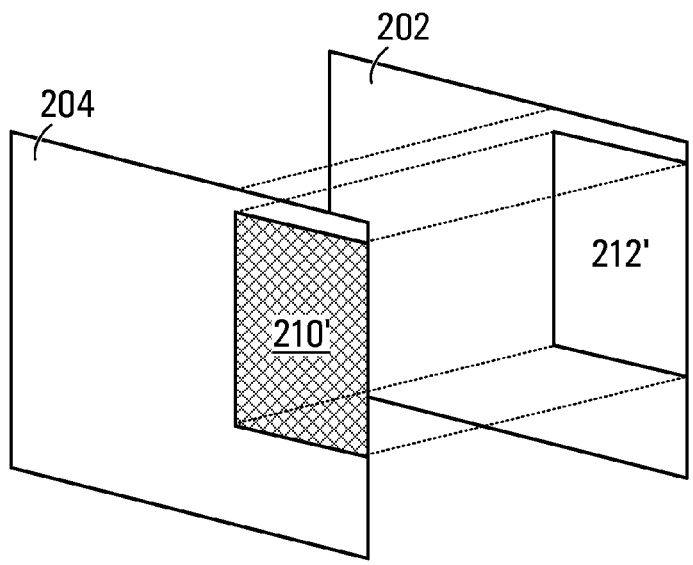
FIG. 3 is a logical diagram illustrating composition of a final image from a foreground plane containing an opaque region, and an underlying plane.

As shown in FIG. 3, if a pixel in region 210' of foreground plane 204' is opaque, then pixels in region 212' of underlying or background plane 202' would not contribute the final pixel in the final image after alpha-compositing.

Accordingly, in embodiments exemplary of the present invention, each layer may be provided to GPU 114 with information that about which regions may be excluded from computation of final pixels. This is particularly desirable in layers that may have very few of the pixels contributing to the final image.

In an exemplary embodiment, each plane in a layer may be associated with data structures that describe its transparency layout. When a plane from a given layer is forwarded to GPU 114 for compositing, its associated data structures are also provided. The data structures, may be called transparency descriptors or bounding box descriptors, and may contain partition information about the plane. As will be appreciated by those skilled in the art, transparency descriptors or bounding box descriptors need not be rectangular in shape, but may describe other regular shapes such as triangles and other types of polygons, as well as irregular shapes.

Figure 4:
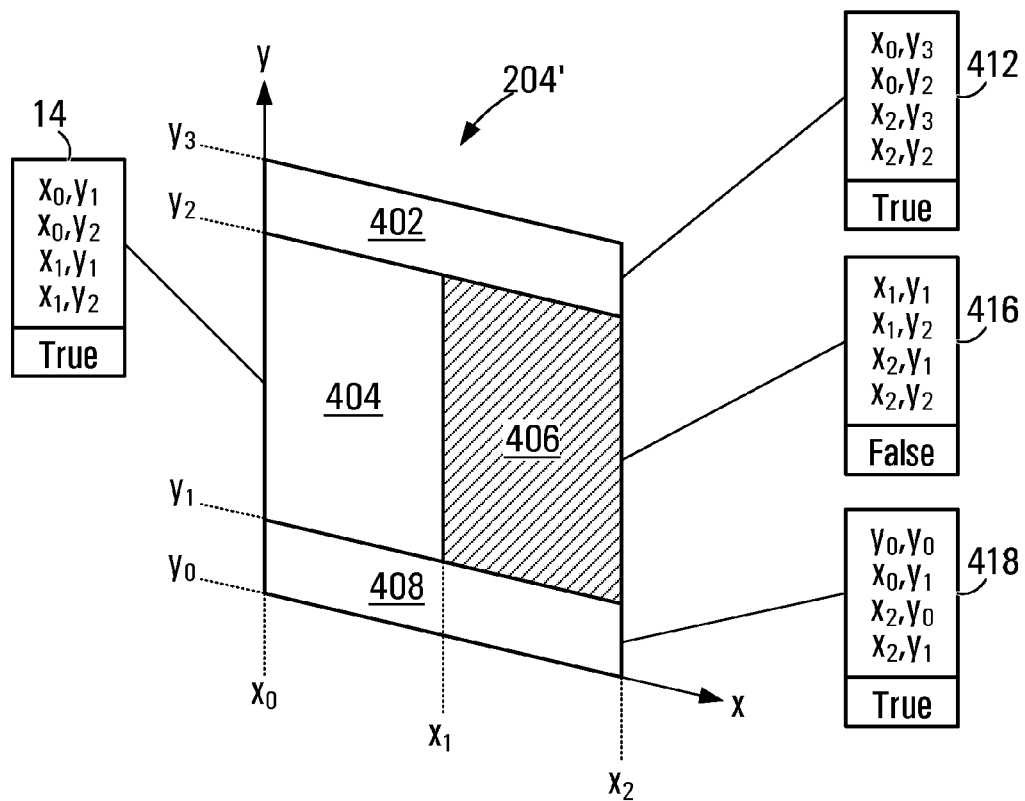
FIG. 4 shows an exemplary partition of the foreground plane of FIG. 2 and the corresponding bounding box descriptor for each partition.

FIG. 4 shows an exemplary partition of plane 202' and bounding box descriptors 412, 414, 416, 418 associated with partitions 402, 404, 406, 408. Each partition is defined by its boundaries which are shown as four coordinates. Thus for example, partition 402 is described by bounding box descriptor 412 using co-ordinates $(x_0, y_2)$, $(x_0, y_3)$, $(x_2, y_2)$, $(x_2, y_3)$ denoting its bottom left, top left, bottom right and top right positions respectively (in FIG. 4) and a Boolean value (true or false) indicating if the partition is entirely opaque. Some partitions may have nothing interesting to present to the process and thus may be dropped from the composition job altogether.

The bounding box descriptors may be data structures defined in memory using for example the C programming language as follows.

```
struct {
    int __x1; int __y1; /* bottom left */
    int __x2; int __y2; /* top left */
    int __x3; int __y3; /* bottom right */
    int __x4; int __y4; /* top right */
    bool __bOpaque;
} BoundingBoxDescriptor;
```

Many other alternative representations, programming languages and data structures or classes are of course possible. For instance, the data structure above may contain just one set of coordinates (e.g., of the top left corner), and the dimensions of the bounding box (as width and height member variables), which are sufficient to obtain all other remaining coordinates.

A given partition may have a uniform transparency or alpha channel value for all its pixels. In one embodiment, each partition may be chosen to be rectangular, for simplicity of representation, so that four coordinates suffice to completely describe each one of partitions 402, 404, 406, 408. However, it will be appreciated that other shapes such as regular polygons may be used along with corresponding bounding box descriptors. In general, irregular transparency is more conveniently represented by per pixel alpha. However, the presence of uniform transparency value can simplify and speed up the process if the associated hardware (e.g. GPU 114) has optimized logic for that.

Application software such as a movie player application may decode each layer and prepare bounding box descriptors for planes that are to be overlaid. For example, subtitles often only occupy a narrow vertical range (for instance, within $y_0$ to $y_1$ in FIG. 4) on the display screen. Thus bounding box descriptors may be easily used to indicate that only a narrow region (e.g. partition 406) has some useful pixel to composite. Partitions allowing for display of command buttons and menus may be similarly specified using bounding box descriptors. Application may assemble bounding box descriptors as shown in FIG. 4 for each foreground layer and forward them to GPU 114 by way of a device driver.

For instance, a Blu-ray disc typically contains graphics sub-streams multiplexed with the main video stream. The graphics sub-streams are used to provide interactive graphics objects such as buttons and presentation graphics such as text subtitles, to be overlaid onto the main video plane during display. Graphics objects such as buttons are retrieved from a graphics stream and decoded to construct a graphics plane. Transparency information about these objects may be provided as per-pixel alpha or optionally per object alpha values. These objects are first composited onto graphics planes, which are then overlaid onto a corresponding main video plane by way of digital compositing to form a frame or final image for display.

A graphics stream provides a color value and a transparency (alpha) value for pixels of a graphics object. The transparency values are used during composition. Specifically, in one mode of Blu-ray called high definition movie mode (HDMV), pixels in a graphics plane are each represented by an 8-bit value. The 8-bit value is an index a color palette associated with the object. The color palette may contain color entries such as YCbCr values with their corresponding alpha value. One such format that is commonly used in the computer graphics industry is the AYUV format.

A graphics stream is typically made up of one or basic syntactical elements called segments, which are used to parse the stream.

For example, in a Blu-ray graphics stream, there are three types of segments called Graphics Object Segment, Composition Segment and Palette Segment. A Composition Segment describes the appearance of its corresponding graphics object (e.g. button), by way of a number of parameters, including for example, the horizontal and vertical coordinates of the object within the graphics plane, a rectangular region enclosing the object (for text subtitles), cropping information and the like. The Graphics Object Segment may be a run-length encoded bitmap image data. The Palette Segment provides color and transparency data used to translate each 8-bit index value to full color when compositing.

In one embodiment, application software executing on processor 106 may extract and decode these segments. After Graphics Objects belonging to the same graphics plane are decoded, processor 106 may construct the graphics plane conterminous with a corresponding main video plane. The graphics plane may be initially transparent. Each decoded graphics object is placed within the graphics plane based on its associated Composition Segment. As noted, for each graphics object, an associated Composition Segment contains the necessary placement information.

Once graphics objects are placed on a graphics plane, processor 106 may examine the alpha values of pixels of the plane for opaqueness. For opaque pixels on the graphics plane, alpha-blending is unnecessary.

If an object is opaque, then processor 106 may populate a bounding box descriptor corresponding to the shape of the object. If only a part of an object is opaque, then processor 106 may identify the opaque part, and construct a bounding box descriptor corresponding to it. The determination of opaque regions should be done for each object on the plane, and a corresponding bounding box descriptor may be prepared for each opaque region identified. Again, alpha values may be provided on a per pixel basis. Alternately an alpha value that corresponds to an entire object or a region may be used. This is advantageous, for example, in creating some visual effects such as fading in or fading out of objects during animations.

As will be appreciated, if an opaque object happens to be rectangular (e.g., a rectangular button) then processor 106 may simply map the object's corner coordinates onto the bounding box descriptor structure of FIG. 4. A device driver may then readily form a mask by populating a stencil buffer with the shape described in the bounding box descriptor. Specifically, pixel locations corresponding to opaque regions (e.g. corresponding to boundaries of a button image), may be set to 1 in the stencil buffer to indicate to GPU 114 that corresponding pixels may be excluded from alpha-blending.

After the graphics plane is constructed, it may then be blended with a corresponding underlying main video plane by GPU 114 excluding pixel locations precluded in the stencil buffer, to create a frame for display in a buffer. In other words, pixels in the foreground graphics plane not covered by the mask formed in the stencil buffer may be blended with their corresponding pixels in the underlying main plane.

For multiple graphics sub-streams (e.g., a presentation graphics stream and an interactive graphics stream, in Blu-ray) processor 106 may use only the foreground plane to form bounding box descriptors—ignoring any underlying planes (i.e., any of the other planes present including the main video plane). This precludes alpha-blending of pixels in the underlying planes that may be occluded by opaque pixels in the foreground graphics plane.

In alternate embodiments, a foreground plane such as a popup menu may be preloaded and decoded before use from a Blu-ray or HD DVD disc into memory. These objects can be brought in as a response to user interaction. Thus an underlying plane may be formed from a portion of the decoded stream, while a foreground plane may simply be preloaded from memory and composited.

Figure 5:
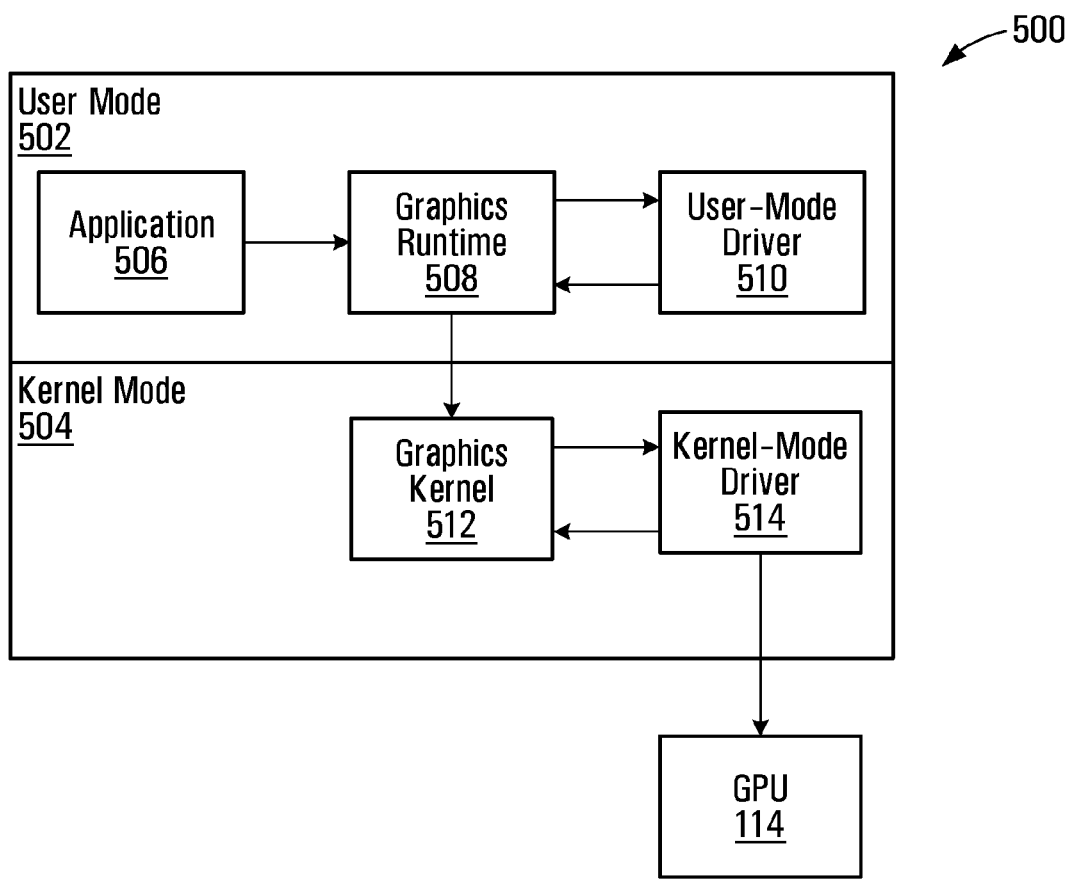
FIG. 5 is a logical diagram of software modules involved in the transmission of a bounding box descriptor from an application to a GPU in an exemplary embodiment of the present invention.

FIG. 5 depicts a logical diagram of software modules involved in the transmission of a bounding box descriptor from an application such as application 506 to GPU 114 in one exemplary embodiment. These modules may be loaded in memory 108 from a non-volatile storage such as a hard disk. For example, memory 108 may be loaded with the Windows® Vista™ operating system containing user-mode processes 502 and kernel-mode processes 504, and a windows device driver model (WDDM) compliant device driver (for a graphics card containing GPU 114). The device driver may include a user-mode driver 510 and a kernel-mode driver 514. The device driver may use an operating system provided graphics subsystem which may include a user-mode graphics runtime 508 and a graphics kernel 512. Graphics runtime 508 may for example be the Direct3D runtime while graphics kernel 512 may for example be the DirectX® graphics kernel.

Application 506 may make calls to graphics runtime 508. Graphics runtime 508 in turn may invoke functions supplied by user-mode driver 510. Conversely, user-mode driver 510 may also call graphics runtime routines provided by graphics runtime 508. These runtime routines help provide kernel-mode services to user-mode driver 510 by forwarding requests to graphics kernel 512. In this way, application 506 may provide data to GPU 114 through user-mode driver 510, graphics runtime 508, graphics kernel 510, and finally kernel-mode driver 514 which may access memory used by GPU 114.

In particular user-mode driver 510 may call user-mode functions, suitable for resource allocation supported by the graphics runtime 508, to allocate a resource for a bounding box descriptor. Graphics runtime 508 may then relay the calls to graphics kernel 510, which in turn may call the equivalent kernel-mode function to allocate a resource in video memory. Methods for passing data from application to kernel-mode device drivers for graphics adapters are well known in the art. The bounding box descriptor data would be interpreted by the kernel-mode driver 514 and then construct GPU commands to populate a depth buffer or a stencil buffer.

A depth buffer (also called z-buffer) is a block of video memory used to store depth information for pixels that reside in an image or frame buffer. Consequently a z-buffer is usually of the same size as its corresponding video frame. Typically the z-buffer is initialized to represent the distance of the back clipping plane (i.e., each location is set to a maximum depth value, $z=z_{max}$), while the frame buffer is initialized to the pixels of the background color. The smallest z value (e.g. $z=0$) in the z-buffer represents the front clipping plane (closest to a viewer). When drawing three dimensional (3-D) objects, polygons are converted (scan-converted) to into the frame buffer. During conversion, if a polygon point being converted at location (x,y) is closer to (no farther from) the viewer than the pixel already in the frame buffer (determined by comparing the stored z value with the current z value), then the frame buffer location (x,y) is overwritten with the new color and the new depth (z value) is stored in the z-buffer at location (x,y). Otherwise, the frame buffer and corresponding z-buffer location remain unchanged. After all input polygons are processed, the frame buffer would contain the correct final image colors in accordance with the depth of each polygon surface. It can be seen that polygons may be processed in arbitrary order.

A stencil buffer such as stencil buffer 602 is usually bit-plane or bit-mask, implemented much like a z-buffer. The stencil buffer may reside in the same physical buffer as a z-buffer. For example, in a 16-bit buffer, each location may store a 15-bit z value (depth value) and 1-bit stencil value. In other implementations, each location of a 32-bit buffer may store a 24-bit depth (z) and 8-bit stencil values. It is possible to perform simple arithmetic operations on the contents of the stencil buffer on a per-pixel basis as polygons are rendered. For example, the stencil buffer can be incremented or decremented, or the pixel can be rejected if the stencil value fails a simple comparison test. This is useful for effects that involve marking out a region of the frame buffer (image buffer) and then performing rendering only the marked (or unmarked) region.

A mask may thus be formed in the stencil buffer indicating pixel positions corresponding to opaque foreground plane pixels. After extracting their transparency values, pixels in the foreground graphics plane not covered by the mask formed in the stencil buffer, may be blended with their corresponding pixels in the underlying planes (which may include the main plane and other underlying graphics planes except for the foreground plane). The alpha-blending is carried out in accordance with the transparency values, as noted above. Pixel locations corresponding to the mask (i.e., those pixel locations excluded from the blending operation), in the image buffer (frame buffer) are set to corresponding opaque pixels of the foreground plane.

Figure 6:
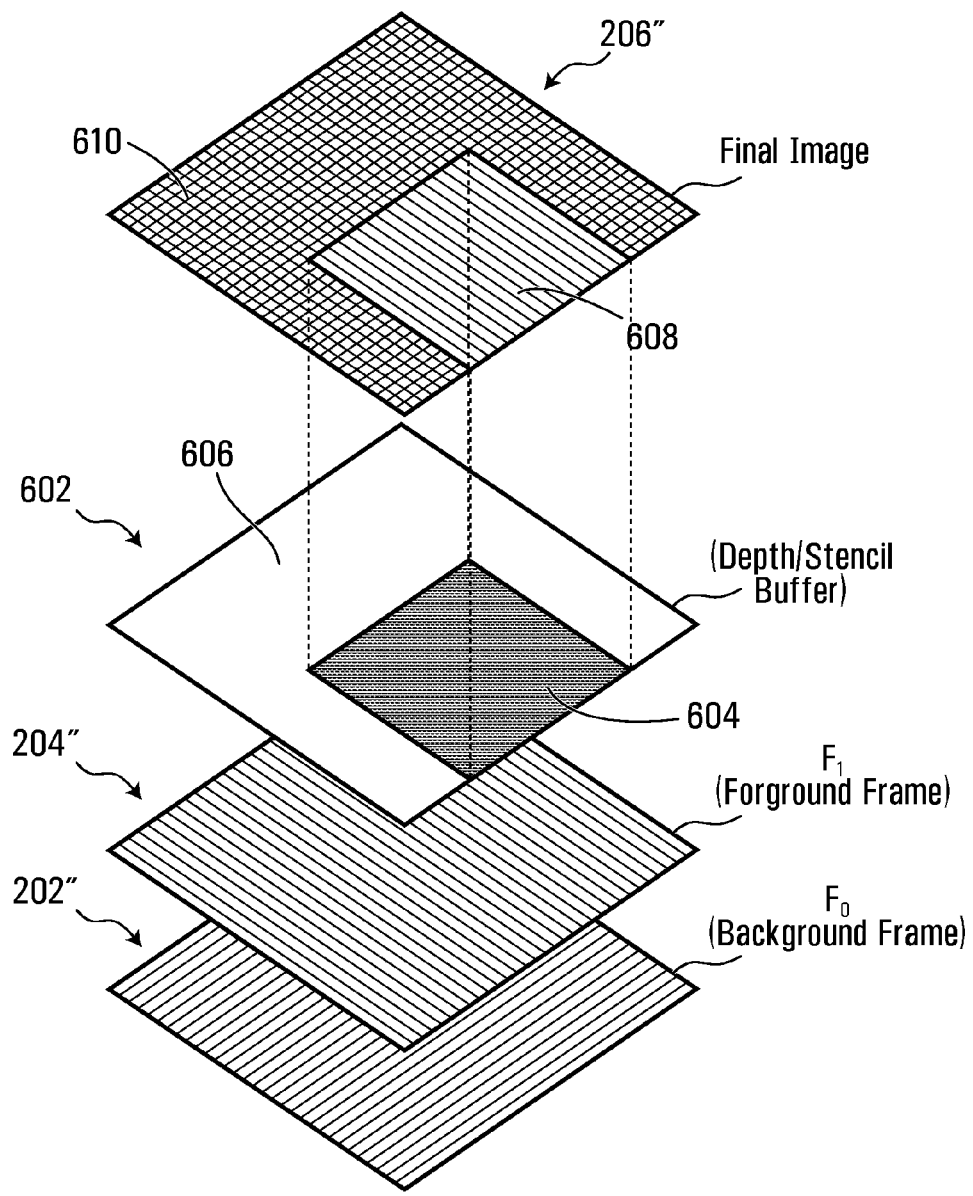
FIG. 6 is logical diagram illustrating the use of a stencil buffer in compositing a final image from multiple planes.

FIG. 6 shows logical diagram illustrating the use of a stencil buffer in the process of compositing a final image from multiple planes in an exemplary embodiment of the present invention. A stencil buffer 602 is used to form a mask so as to indicate that region 604 of foreground plane 204" is opaque while the rest of background plane 202" outlined by region 606 is transparent, or semitransparent or translucent (i.e., partially or completely transparent). Thus, alpha-blending needs to be performed only on pixels corresponding to locations in region 606.

Final image 206" shows the superposition of background plane 202" and foreground plane 204". Region 608 (corresponding to region 606 of stencil buffer 602) displays pixels from foreground plane 204" only; while the rest of final image 206" (region 610) is a superposition of both background pixels (from plane 202") and foreground pixels (from plane 204") as illustrated by the crisscrossing pattern formed from intersection of the individual line patterns of planes 202", 204".

Figure 7:
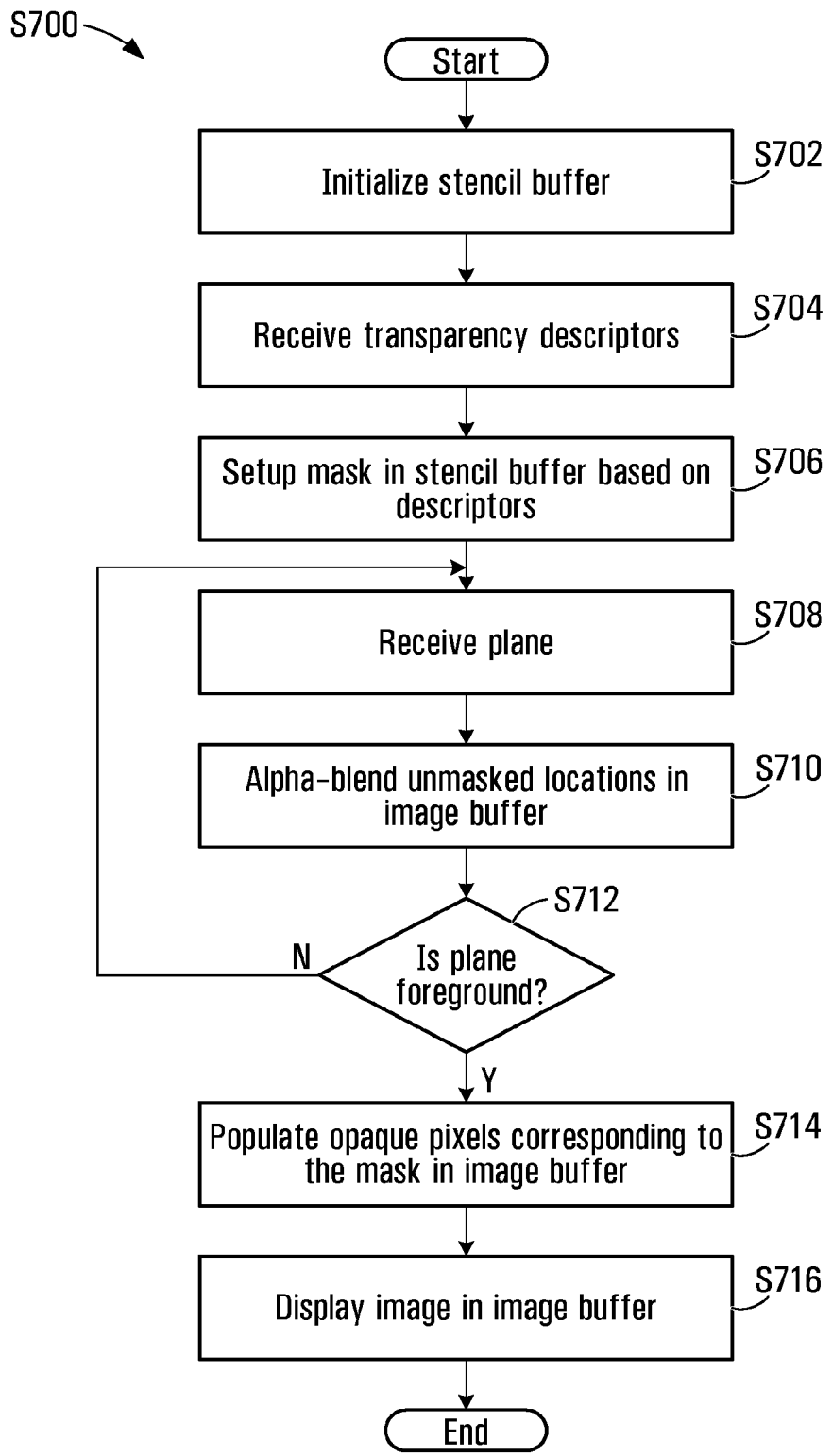
FIG. 7 is a flowchart depicting a method of compositing an image from multiple planes, exemplary of an embodiment of the present invention.

FIG. 7 depicts a flowchart illustrating steps S700 in one exemplary embodiment of the present invention. To construct a video image from a foreground plane and underlying planes, processing engine 104 (e.g. GPU 114) first initializes the stencil buffer (S702). For example, all pixel positions in the stencil buffer may be set to 0.

Next, processing engine 104 (e.g. GPU 114) may receive bounding box descriptors for the foreground plane (S704) of the current image or frame, and proceed to setup a corresponding mask in the stencil buffer based on the descriptors (S706). In particular, if a bounding box descriptor indicates that a given region is opaque, then corresponding pixels locations in the stencil buffer may be set to 1 to indicate that they should be excluded from blending operations.

GPU 114 may then receive a plane (S708) and alpha-blend pixels not covered by the mask, in an image buffer (S710).

If the received plane is the foreground plane (S712), then construction of the image in the image buffer may be completed by populating opaque pixel locations in the image buffer with corresponding pixels of the foreground plane (S714). The constructed image may then be displayed (S716).

If the received plane is an underlying plane, then as shown, GPU 114 may continue to receive the next plane (S708).

Thus, for N underlying planes, after the foreground plane is received, only those pixels in the foreground and the N underlying planes, which are not covered by said mask, would be alpha-blended in accordance with their associated transparency value, in the image buffer. The rest of the pixel locations in the image buffer (i.e., those covered by the mask in the stencil buffer) would be populated with corresponding opaque pixels from the foreground plane.

Compositing or alpha-blending may be performed starting with a background underlying plane and ending in the foreground plane as noted above. Advantageously, intelligent use of the stencil buffer as shown helps exclude pixels which are behind opaque pixels (in underlying planes), from the alpha-blending calculations during composition of the final image. As can be appreciated, this leads to a very efficient use of GPU cycles during composition and avoids unnecessary computations.

For subtitle type texts which are provided using graphics plane within a predefined narrow region usually near the bottom, a horizontal strip may be mapped out on a stencil buffer 602 corresponding to a text region on the graphics plane. The text region may have a background color. Efficient alpha-lending operations can be carried out by setting up stencil buffer 602 to correspond to the text region so that regions that would not contain text (subtitles) are excluded from alpha-blending computations.

The present invention may be used in personal computing machines, workstations, laptops, projectors, digital video players such as HD DVD and Blu-ray player devices and the like.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of forming a video frame from a video stream comprising a multiplexed plurality of sub-streams, said method comprising:

forming a foreground plane comprising a plurality of foreground pixels, said pixels having color values and alpha values associated therewith;

forming one or more underlying planes from at least one of said sub-streams;

forming a mask data structure comprising a bit corresponding to each pixel location in said foreground plane, said data structure for storing a mask to identify pixel locations at which pixels of said foreground plane are opaque;

determining an alpha value associated with each of said foreground pixels, wherein at least some foreground pixels have alpha values indicative of full opacity and occlude corresponding pixels of said underlying plane at the same pixel locations;

populating said mask data structure by setting the bit for each pixel location corresponding to a foreground pixel with an associated alpha value indicative of full opacity to a first binary value indicating that the corresponding pixel locations of the underlying planes are occluded, and setting the bit for each pixel location corresponding to a foreground pixel with an associated alpha value indicative of non-full opacity to a second binary value indicating that the corresponding pixel locations of said underlying planes are not occluded; and blending only those pixels in said one or more underlying planes and said foreground plane at pixel locations not identified as occluded by said mask, in accordance with their associated alpha value, in a buffer; and populating said buffer at pixel locations identified by said mask as occluded, with opaque pixels from said foreground plane.

2. The method of claim 1, comprising forming a second underlying plane, from a second one of said sub-streams.

3. The method of claim 2, wherein said foreground plane is formed from a third one of said sub-streams.

4. The method of claim 2, wherein a pixel in said underlying plane is represented by a quadruple $(r_0, g_0, b_0, \alpha_0)$ and a corresponding pixel in said second underlying plane is represented by another quadruple $(r_1, g_1, b_1, \alpha_1)$, each quadruple indicating red, green, blue and alpha values respectively, and wherein said blending comprises computing red, green and blue components of new pixel $(r_2, g_2, b_2)$ as:

$$r_2 = (1-\alpha_1)\alpha_0 r_0 + \alpha_1 r_1;$$

$$g_2 = (1-\alpha_1)\alpha_0 g_0 + \alpha_1 g_1; \text{ and}$$

$$b_2 = (1-\alpha_1)\alpha_0 b_0 + \alpha_1 b_1.$$

5. The method of claim 2, wherein a pixel in said underlying plane is represented by a pre-multiplied quadruple $(r'_0, g'_0, b'_0, \alpha'_0)$, and a corresponding pixel in said second underlying plane is represented by another pre-multiplied quadruple $(r'_1, g'_1, b'_1, \alpha'_1)$, each quadruple indicating red, green, blue and alpha values respectively, said blending comprising computing a new pre-multiplied pixel $(r'_2, g'_2, b'_2)$ as:

$$r'_2 = (1-\alpha_1)r'_0 + r'_1;$$

$$g'_2 = (1-\alpha_1)g'_0 + g'_1; \text{ and}$$

$$b'_2 = (1-\alpha_1)b'_0 + b'_1.$$

6. The method of claim 1, wherein said buffer forms part of a graphics hardware and said populating said mask comprises:

forming a set of bounding box descriptors corresponding to those pixels in said foreground plane having alpha values representing total opacity; and transmitting said set of bounding box descriptors to said graphics hardware.

7. The method of claim 6, wherein said bounding box descriptors comprise a plurality of polygon vertices and a Boolean value indicating if a polygon formed from said vertices is opaque.

8. The method of claim 7, wherein said bounding box descriptors are data structures defined in memory.

9. The method of claim 1, further comprising forming one or more additional underlying planes, and extracting a transparency value associated with each pixel of said one or more additional underlying planes, wherein said blending further comprises alpha-blending only those pixels in said one or more additional underlying planes, at pixel locations not identified as occluded by said mask, in accordance with their associated transparency value, in said buffer.

10. The method of claim 1, wherein said buffer forms part of a graphics hardware also comprising a graphics processing unit (GPU) and a stencil buffer, and said forming said mask comprises populating said stencil buffer; and said blending is performed by said GPU.

11. A device comprising: a processing engine in communication with memory, said memory comprising an image buffer and a stencil buffer, said processing engine comprising a processor, a graphics processing unit (GPU), and an input for receiving a compressed video data stream, said processing engine, decoding a foreground plane and a plurality of underlying planes from said stream, each of said planes comprising a plurality of pixels and an associated alpha value for each pixel wherein at least some pixels of said foreground plane have alpha values indicative of full opacity and occlude corresponding pixels of said underlying planes at the same pixel locations;

said processing engine operable to: form a mask data structure in said stencil buffer for identifying those pixel locations at which pixels of said foreground plane have alpha values indicative of full opacity, said mask data structure having a plurality of bits, one for each pixel location in said foreground plane; determine an alpha value associated with each pixel of said foreground plane; set to a first binary value each bit corresponding to a pixel location at which the pixel of said foreground plane occludes corresponding pixels of said underlying planes, and set to a second binary value each bit corresponding to a pixel location at which the pixel of said foreground plane does not occlude corresponding pixels of said underlying planes; blend only those pixels in said planes at pixel locations having said second binary value in said mask data structure, in accordance with their said associated alpha value, in said image buffer; and populate pixel locations in said image buffer identified as occluded by said mask, with said opaque pixels from said foreground plane.

12. The device of claim 11, wherein said memory comprises local memory in said processing engine directly accessible by said GPU, and said image and stencil buffers are formed in said local memory.

13. The device of claim 12, further comprising an operating system (OS), device driver and application software, loaded in said memory wherein said processor executes said application software, OS and device driver, to perform said compositing in said image buffer.

14. The device of claim 11, wherein said stream comprises a plurality of multiplexed sub-streams and said processing engine decodes each of said plurality of underlying planes from a corresponding one of said plurality of sub-streams.

15. The device of claim 14, wherein said GPU in said processing engine performs said decoding.

16. The device of claim 14, wherein said processor in said processing engine performs said decoding.

17. The device of claim 14, wherein said foreground plane is read from a processor readable medium and preloaded into said memory.

18. The device of claim 14, wherein said foreground plane is formed by decoding another one of said sub-streams using said decoder.

\* \* \* \* \*